H. COWING.

3 Sheets—Sheet 1

Steam-Plow.

No. 1,041

Reissued Sept. 11, 1860.

H. COWING.

Steam-Plow.

No. 1,041.

Reissued Sept 11, 1860.

H. COWING.
Steam-Plow.
No. 1,041.
Reissued Sept. 11, 1860.
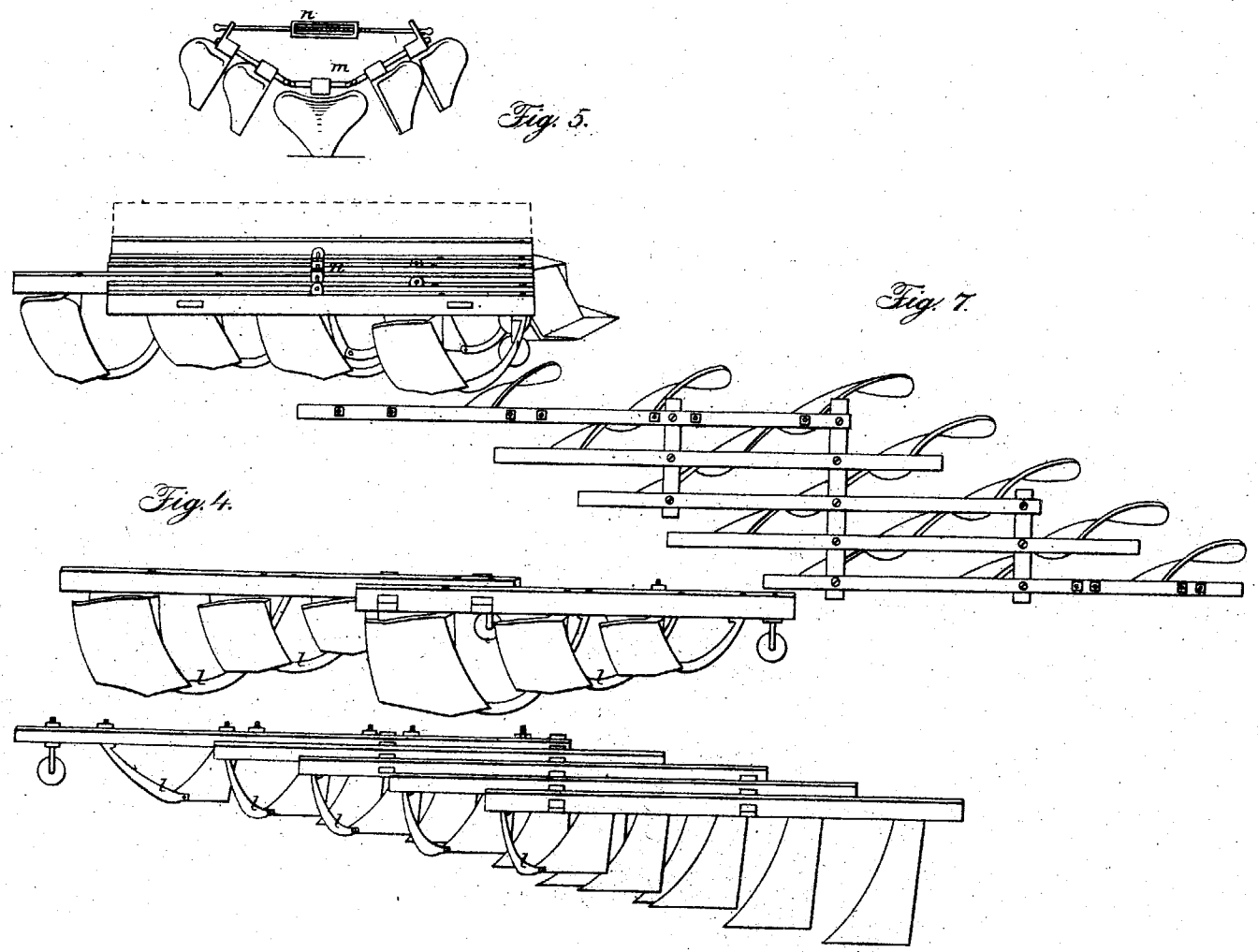

BEST AVAILABLE COPY

UNITED STATES PATENT OFFICE.

HENRY COWING, OF CORPUS CHRISTI, TEXAS.

IMPROVEMENT IN GANG-PLOWS.

Specification forming part of Letters Patent No. 7,795, dated November 26, 1850; Reissue No. 1,041, dated September 11, 1860.

*To all whom it may concern:*

Be it known that I, HENRY COWING, of Corpus Christi, in the county of Nueces and State of Texas, have invented certain new and useful improvements in power applicable to agricultural purposes, and in machinery adapted thereto, of which the following is a full, clear, and exact description, reference being had to the accompanying drawings, which make part of this specification, and in which—

Figure 1:
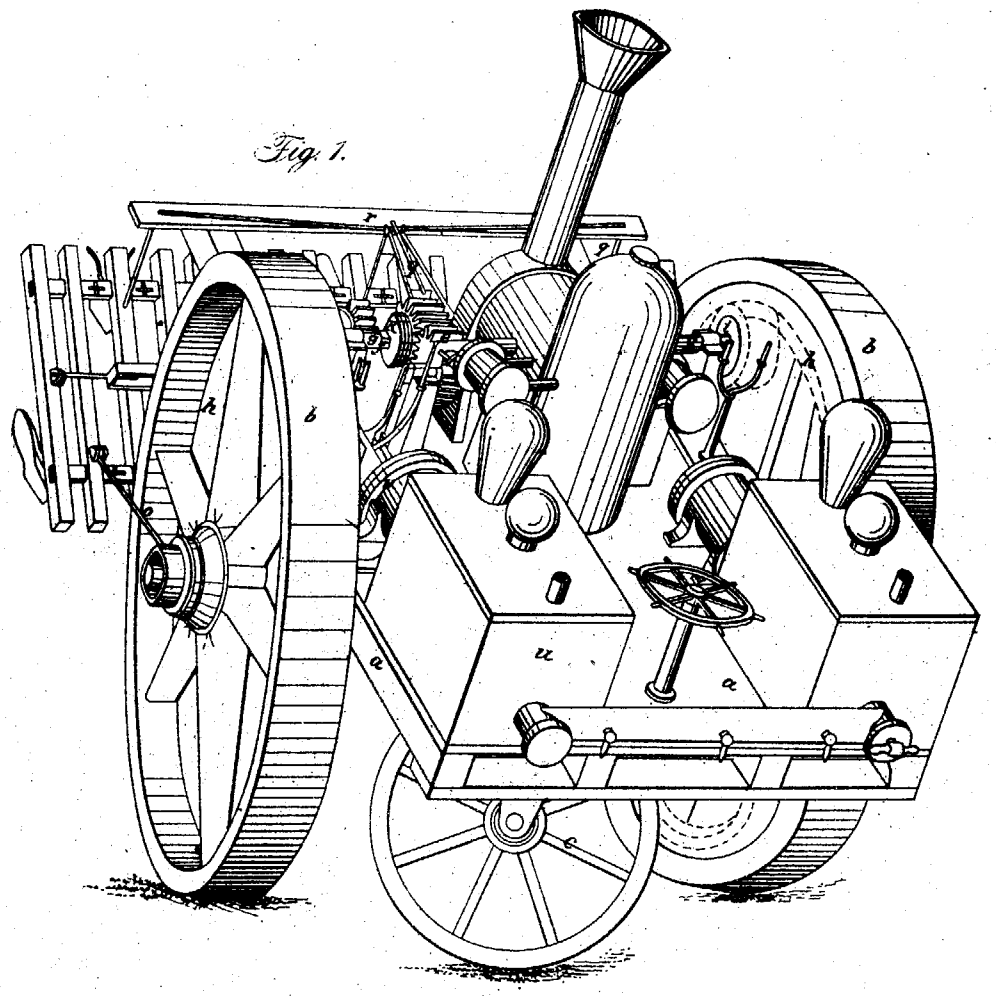
Figure 2:
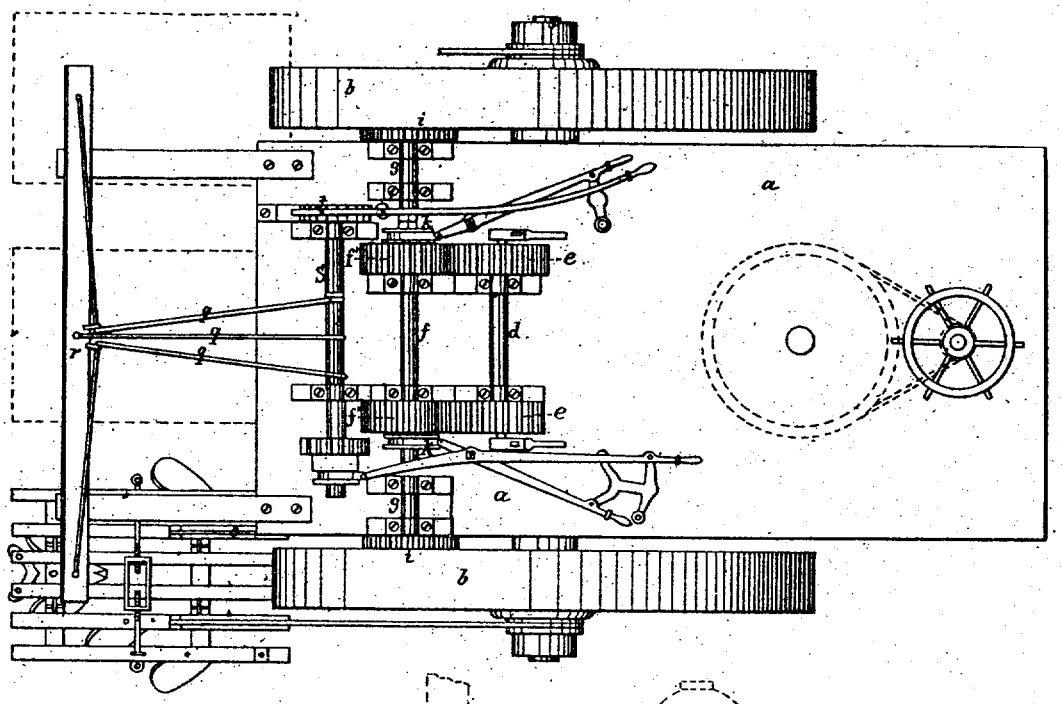
Figure 3:
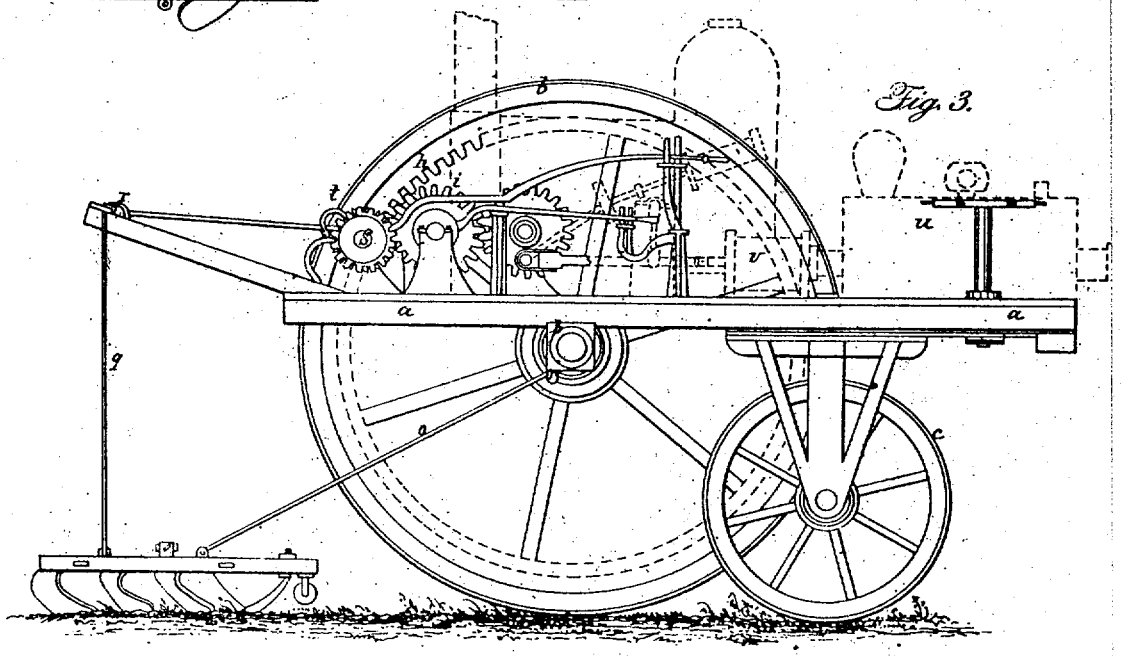

Figure 1 represents in perspective a self-propelling locomotive engine, to which gangs of plows are attached, both embracing my improvements. Fig. 2 represents a plan or top view of the same, showing more especially the arrangement of the mechanism by which the engine is propelled and the plows raised or lowered. Fig. 3 represents a view of one side of the same, showing the details of the pumping and steering apparatuses in addition to the parts referred to in the description of the preceding figure. Fig. 4 represents in perspective a gang of subsoil-plows, showing more especially a device for preventing lateral pressure upon the mold-boards of the same. Fig. 5 represents a view of a gang of plows, (as seen by a person in front of the same,) showing a device whereby the plows may be adjusted and held at any desired angle to the plane of the beam in order to cultivate between ridges with facility. Fig. 6 represents in perspective a gang of plows, showing the manner in which I arrange them for the purpose of pulverizing and mixing the soil. Fig. 7 represents a plan or top view of the gang of plows shown in the preceding figure, and Fig. 8 represents a view of a gang of plows adapted to the cultivation of the sugar-cane.

The object of my invention is to furnish to the agriculturist a labor-saving machine whereby steam may be profitably employed instead of manual labor or animal-power in the ordinary operations of the farm and elsewhere, but especially in plowing and cultivating land; and to this end my invention consists—

First. In mounting the frame which supports the driving mechanism upon high broad wheels and driving the same by means of a train of wheels gearing into cogs on the inner face of the periphery of the supporting-wheels, as hereinafter more fully set forth, whereby I am enabled to employ short cylinders and to place the entire driving mechanism upon the platform of the engine, instead of allowing any part of it to extend below the same. Moreover, I can thus arrange the whole of the machinery, including the cylinders, so compactly as to occupy a space less than the diameter of the driving-wheels.

Second. In adjusting or controlling the depth to which the plows penetrate the ground or the height at which they are held and carried above the same by means of the power of the engine, while at the same time the adjustment is controlled by the engineer or manager of the engine.

Third. In constructing a projecting frame at the rear of the locomotive, which frame is sufficiently elevated above the platform of the engine to permit the plows to be raised above the level of the axle of the supporting-wheels, whereby the machine is enabled to pass over any obstruction the height of which does not exceed that of the axle of the supporting-wheels from the ground.

Fourth. In arranging a windlass operated by the power of the engine in such relation to the overhanging frame that the gangs of plows (when united to the locomotive by a flexible connection) may readily be raised, lowered, or held at any desired elevation by means of a rope or chain passing over the frame and wound upon the windlass.

Fifth. In supporting (where two large driving-wheels and the compact arrangement of the gearing above described are employed) the front of the engine upon a single wheel having a swiveling bearing, and operating the same by means of a band or chain passing around the turning-plate upon which the wheel rests and revolves, by which arrangement I am enabled to turn the machine in a much shorter space than has heretofore been attainable.

Sixth. In arranging the steering-wheels, carrying-wheels, overhanging frame, and gangs of plows in such relation to each other that (where drill-culture is employed) several rows may be cultivated at once, whereby the frequent passing and repassing of the machine over the field is avoided.

Seventh. In constructing the frame of a gang

BEST AVAILABLE COPY of plows in such manner that the plows on each side of the central beam may readily be adjusted and held at any required angle to the horizon or to the plane of the beam, whereby the cultivation between ridges is very much facilitated.

Eighth. In arranging a ratoon or stalk-cutter in front of a gang of plows in such manner that it shall cut up the standing stalks and throw them off at each side, where they will be cut up by the inclined colters attached to the plows, which obviates the necessity of removing the stalks by hand, as has heretofore usually been the case.

Ninth. In arranging a perpendicular plate (or one nearly so) on the furrow side of a subsoil-plow in such manner that the furrow-slice shall be carried above the level of the upper edge of the plate before being turned over upon the preceding furrow, whereby the reversal of the furrow-slice is accomplished in a very thorough manner and the lateral pressure of the furrow-slice against the side of the furrow prevented.

To accomplish the above-named objects I construct a stout frame-work or platform, which forms the body of the carriage, and is mounted upon two large driving or supporting wheels that turn on an axle (as ordinary cart-wheels) about twice as far from the front as from the rear of the frame, and upon one or more smaller steering and supporting wheels, each having its bearing in a separate swiveling frame near the front of the machine. The driving-wheels should have broad treads and be of large size—say not less than fourteen feet in diameter—the larger the better; but I do not confine myself to any particular size. The steering-wheels are of smaller size, and may be placed under the front of the frame. The upper part of the frame in which each guiding-wheel revolves carries a turn-plate which works against the under side of the frame of the engine, and around which an endless band, chain, or cord passes. This chain also encircles a pulley on a vertical shaft near the front of the machine, which shaft extends above the platform, and is provided with a hand-wheel by which to steer the machine.

A locomotive-engine of any of the ordinary and well-known forms of construction is placed upon the platform. The connecting-rods of this engine act upon the cranks of a horizontal transverse driving-shaft above and slightly in rear of the axle of the driving-wheels, and carrying a spur-pinion near each end, which pinions gear into similar ones on a counter-shaft in rear of the driving-shaft. This counter-shaft can, whenever desired, be thrown into gear with two short shafts at each end of and in the same line with it by means of a common sliding clutch and lever. Each of these short shafts carries a pinion which gears into an internally-toothed gear-wheel secured upon the inner side of the tread of the driving-wheels, and it is through this mechanism that the machine is propelled.

A rotating shaft carrying a spur-pinion is arranged near the rear of the frame in such manner that its pinion can readily be thrown into or out of gear with a pinion on the counter-shaft by sliding the shaft endwise in its bearings.

A stout frame is secured to the main frame in such manner that its rear end may overhang the gangs of plows with which it is connected by cords, ropes, or chains secured to the frames of the plows and passing over pulleys on the rear of the frame to the rotating shaft upon which they are wound.

In addition to those used for supplying water to the boilers one or more force-pumps, connected with and driven by the engine, may be placed upon the platform of the machine. These pumps are intended for filling the water-tank, which is also upon the platform, but are so arranged as readily to be used for draining or irrigating the farm, or even for extinguishing fires.

The plows adapted to this machine are various in their characters, according to the requirements of the peculiar service for which they are intended. They are arranged in gangs, (the frames of which may be adjustable in width to suit the breadth of ground to be plowed at each passage of the machine) and are attached to the locomotive by means of drag-straps, rods, chains, or ropes (and by the hoisting-chains) in such manner that they are free to rise and fall in order to conform to inequalities of the surface of the ground. Each plow is secured to its beam in such manner as to be readily removed, replaced, or adjusted in depth. The depth to which the plows penetrate the ground may be regulated by means of gage-wheels attached to the frames in the usual well-known manner.

For hilling land for corn, cane, &c., I use a gang of plows consisting of a central beam to which the side frames are attached by joints in such manner that they may be raised and lowered in order to set the plows attached to them at such an angle to the sides of the ridge (while the center plow is in the furrow) as may be desirable, the said frames being held at the desired angle by means of an open frame (like that sometimes used in straining hand-saws) having holes in its ends with female screw-threads cut therein, into which screw-rods pivoted to the outer edges of the jointed frames pass. In this kind of frame I sometimes employ a single double mold-board plow secured to the central beam, in order to form a water-furrow with a series of single mold-board right and left plows secured to the side pieces of the frame to throw the earth away from the furrow to form the ridge.

Where a deep water-furrow is essential I sometimes empl a double mold-board plow secured to the center beam to throw the soil from the center of the furrow, in combination with a smaller plow of similar form which follows immediately behind the other and forms a deeper water-furrow. This device is especially valuable in cultivating between rows which are close together.

For cutting corn, cane, &c., I arrange a stalk or ratoon cutter in front of the gang of plows. This cutter consists of a double mold-board with a horizontal share, which is held at a suitable distance above the ground by means of gage-wheels, upon which the plow-frame runs. As the frame advances the ratoons or stalks are cut off by the horizontal blade or share. If the stalks are long, the mold boards of the cutter throw them over upon the ground, where they are cut up by the inclined colters hereinafter described, and turned under by the plows which follow them.

Where single mold-board plows are employed I attach a plate to the bottom of the mold-board on the furrow side of the same in such manner that it shall be perpendicular, or nearly so, to the ground. As the mold-board advances through the ground the furrow-slice cut by it is raised by the plate and falls over its top, by which means the lateral pressure of the furrow-slice against the side of the furrow is prevented.

For plowing deeply and turning the sward completely under the subsoil, I employ a gang of three or more plows, each succeeding one of which penetrates more deeply than that which precedes it, and turns a thin slice of the subsoil over upon the one previously reversed. The plows may also be so arranged in an oblique range that each succeeding plow can take up the slice left by its predecessor and turn it over, together with an additional slice of its own. The third plow may then turn these two slices over, and an additional one cut by itself besides, and so on, to any desired extent, by which means the soil will be thoroughly stirred, loosened, and pulverized. Each plow is furnished with a colter or blade extending downward and backward from the frame to the point of the mold-board, to which it is connected, in order to cut the sod and to lift the plow-out of the ground in case of meeting an obstruction through which it could not cut, by which means the breakage of the mold-boards is prevented.

In the accompanying drawings, the frame or platform *a* of the machine is represented as supported by two high wheels, *b*, with broad treads turning like the wheels of a cart, on an axle, *p*, the bearing of which is considerably nearer the rear than the front of the platform, and by a smaller supporting and steering wheel, *c*, placed under the center of the frame, near its front, and having its bearings in the vertical swiveling frame A, which is constructed in a manner well known to mechanics, and which will readily be understood by reference to the drawings. A cord or chain, $c^2$, passes around the turning plate $c'$ on the upper part of the frame A, and around a pulley, $c^3$, on the lower end of the vertical post A′, which extends above the platform *a*, and is turned by means of a hand-wheel, D, at its top. This arrangement allows much more freedom of movement than if segmental or other cog-gearing were employed to actuate the steering mechanism.

The water-tanks *u* and force-pumps $l'$ are placed upon the front of the frame. The air-chambers G of the pump, the stop-cock H to direct the stream of water either into the tank or into the discharge-apertures, and the small nozzles $i'$ for the attachment of hose are all connected with the forcing-chamber of the pumps. The large pipes F, provided with suitable removable plugs, L, are for the attachment of hose or pipes of large size for purposes of drainage or irrigation. The suction-pipes may be attached in any suitable manner, and no description of them is necessary, as the method of applying them is well understood by all skillful pump-makers.

A locomotive-engine of the ordinary description is placed upon the platform, and its connecting-rods J′ act upon the cranks of the driving-shaft *d*. The connecting-rods J of the pumps $l'$ are also connected to the same shaft, which carries two spur-pinions, *e*, which gear into corresponding pinions, *f*, on the counter-shaft $f'$. Two short shafts, *g*, turn in suitable bearings at each end of the counter-shaft $f'$, and in line with it, and can readily be connected with it by means of common sliding clutches *k*, acted upon by levers *z*. The shafts *g* carry spur-pinions *i*, which gear into the internally-toothed spur-wheels *h* upon the inner side of the tread of the driving-wheels *b*, upon which the greater portion of the weight of the machine rests and by the revolution of which it is propelled. By this means I am enabled to employ a crank of small radius, and thus to secure such a compact arrangement of the driving mechanism that the whole of it, including the cylinders, may be placed upon the platform instead of being below it, and occupy a space less than the diameter of the driving-wheels *b*, by which means the transportation of the machine over rough or uneven ground is very much facilitated, and it is rendered lighter and more compact than it could be if external gears were used on the driving-wheels. This will readily be seen by an inspection of the drawings.

Near the rear of the frame I place a revolving shaft or windlass, *s*, which turns in suitable bearings in the frame *a*, and carries a pinion, *t*, which can readily be thrown into or out of gear with the pinion *f* on the counter-shaft $f'$ by sliding the shaft *s* endwise in its bearings by means of the hand lever $x'$. The windlass is held from turning, when required, by a pawl, $t'$, upon the frame taking into a ratchet-wheel, $u'$, upon the shaft. The pawl forms a part of and is operated by the hand-lever *x*.

A projecting frame, *r*, is secured to the frame *a* by means of bolts or screws to permit of its removal when desired. This frame is represented in the drawings as secured to the rear of the platform *a*, and inclined backward and upward at an angle of, say, from five to ten degrees, and projects a sufficient distance to overhang the gangs of plows.

The plow-frames are connected to the engine by rods, ropes, or chains *o* in such manner as to permit them to rise and fall freely to adjust themselves to the inequalities of the surface of the ground over which they are drawn. The plow-frames are also attached to the engine by ropes or chains *q*, which pass over pulleys in the frame *r*, and are wound upon the windlass *s*.

Two gangs of subsoil-plows secured in the same frame are shown in Fig. 4, each gang consisting of three plows, each of which penetrates the soil to a greater depth than that which precedes it. These plows consist of an inclined colter, *l*, attached to the point of an ordinary mold-board plow, $l^2$, secured to the frame in any suitable manner. The depth to which the plows penetrate the soil may be adjusted by the gage-wheels *w*.

Each mold-board may have a plate, *y*, of metal secured to its lower edge in such manner that it shall stand perpendicularly on its edge, or nearly so, and be parallel to the line of the furrow. As the plows advance the furrow-slice is forced up between the plate *y* and the face of the mold-board until it reaches the upper edge of the plate, over which it falls. The height of the plate is sufficient to lift the furrow-slice entirely above the furrows previously turned before reversing it, by which means the lateral pressure of the slice being cut against the furrow previously turned is prevented.

For cultivating between ridges gangs of plows constructed as in Fig. 5 may be employed. The central beam, *m*, of the frame may be provided with cross-bars *m'*, to which the side pieces, $m^2$, which carry the plows *n'*, may be jointed. These side pieces, and consequently the plows, may be adjusted and held at any desired angle to the horizon by means of screw-rods $n^3$, pivoted to the outer edges of the side pieces, the inner ends of which rods screw into a straining-frame, *n*, which can be turned by hand to cause the rods to approach or recede from each other. In this figure a double mold-board plow, $n^2$, is shown as secured to the central beam, *m*, of the frame to run in the bottom of the furrow, while the single mold-board plows *n'* are attached to the side pieces on each side to throw the earth outward from the center to form the ridges.

Two double mold-board plows, B B', one following directly behind the other, and penetrating more deeply to form a deeper water-furrow, are shown in Figs. 3 and 8. The latter figure also represents a gang of plows arranged for cutting down and plowing under stalks, &c. A double mold-board plow, C, is secured to the front of the frame which carries the plows, and is provided with a horizontal blade, C', which is held at any desired elevation above the ground by the gage-wheels *w*, and as the plow advances cuts off the standing stalks or ratoons, which fall upon each side of the plow and are cut up by the inclined colters *l*. Should these colters encounter any obstacle which they cannot sever, they will rise over it, by reason of their backward slope, and carry the plows with them, thus preventing them from being broken.

To pulverize the soil and make it perfectly mellow without clods, a series of three gangs of plows can be so arranged (see Figs. 6 and 7) as to throw the soil from one to the other, the first plow of the third beam, 3, taking a furrow-slice two inches in depth and throwing the soil before the second plow of the second beam, 2, which turns the four inches before the third plow of the first beam, 1, which turns six inches over, and in this way the soil becomes perfectly mellow.

The operation of the machine is as follows: Rotary motion being imparted to the driving-shaft *d* through the power of the engine, the counter-shaft *f'* and short shafts *g* are caused to revolve. The pinions *i* on these short shafts mesh with the cogs *h* on the inner face of the treads of the driving-wheels *b*, which are thus caused to rotate and propel the machine, dragging the plows after it. The steersman stands upon the front of the engine and guides it by turning the hand-wheel D. When the end of the furrow has been reached the engineer throws the windlass *s* into gear by sliding it endwise on its shaft by means of the lever *x'*, and the ropes or chains *q* are wound upon the windlass until the plows have been elevated to a sufficient height, when the windlass is thrown out of gear by reversing the lever. The plows are held up by the pawl and ratchet *u'* on the shaft *s*. The engineer then disconnects one of the driving-wheels from the engine by means of the clutch *k* on the shaft *g*. The steersman turns his wheel in the proper manner, and the power of the engine being applied to the other driving-wheel, the machine can be turned within a space very little, if any, greater than its own length. The plows may, if desired, be elevated sufficiently to pass over the fence or over the standing crop in order to diminish the space in which the engine turns, and can be lowered at any moment by releasing the pawl from the ratchet-wheel *u'*.

The overhanging frame *r* is shown as attached to the frame of the engine in a manner which admits of its ready removal and replacement. The plow-frames can also readily be detached and the machine thus left free to perform the various draft operations required upon a farm.

By reference to Fig. 2 of the drawings it will be seen that the arrangement of the steering-wheel *c*, ground-wheels *b*, and gangs of plows is such as to admit of cultivation between the rows of standing crops when the height of the crops does not exceed that of the lowest part of the frame from the ground, and as almost if not all the cultivation required is bestowed upon the crop before it has attained this height, it practically fulfills all the conditions required for this purpose.

The piston-rods I of the force-pumps $l'$ are connected with the cranks $k$ on the driving-shaft $d$, and the whole power of the engines may be exerted upon the pumps when required by disconnecting the counter-shaft $f'$ and short shafts $g$, as hereinbefore described. Thus it will be seen that the engine can readily be propelled from place to place by its own power, and that then the same power can be applied to draining or irrigating the land, or even to the extinguishment of fires, the apparatus for effecting which objects has already been described.

By the compact arrangement of the gearing hereinbefore described, in addition to the advantages above referred to, I am also enabled to turn the machine in a very short space, as from the peculiar arrangement of the steering-wheel it can be turned even to a right angle with the path of the machine, if required. My arrangment of the points of support for the weight of the engine is also a very advantageous one, as by it the weight of the front of the machine is made to counterbalance that of the overhanging frame and the plows, and the weight of both, acting upon the carrying-wheels as a fulcrum, serves to increase the adhesion of the wheels to the ground, and consequently the tractive power of the engine.

The details of much of the machinery herein described or referred to is old, but their combination in this compact form for the various operations of a plantation are here first essayed. For this reason a more detailed description of the construction of the various parts of the mechanism is deemed unnecessary here, the construction of such parts being well known to persons skilled in the construction of this kind of machinery.

It is also obvious that my invention may be modified in various ways without departing from the spirit of my improvements, which modifications would readily suggest themselves to an ingenious mechanic after reading my specification or seeing my machine.

What I claim is—

1. The combination of the driving-shaft $d$ and pinions $e$, the counter-shaft $f'$ and pinions $f$, the short shafts $g$ and pinions $i$ with the internally-geared spur-wheels $h$, when arranged for operating with plows, substantially as and for the purpose set forth.

2. Raising and lowering the plows, substantially in the manner described, by an apparatus operated by the power of the engine when the said apparatus is under the control of the engineer.

3. A projecting frame at the rear of the engine when the same is arranged to overhang the plows and is sufficiently elevated to permit them to be raised above the axle of the supporting-wheels or the lowest portion of the frame, whereby the engine is enabled to pass over obstructions with facility.

4. The combination, in a steam-plow, of a hoisting apparatus operated by the power of the engine with an overhanging frame, substantially as described, for the purposes set forth.

5. The steering apparatus, arranged and operating as described, in combination with the frame, gearing, and plows herein described, for the purpose set forth.

6. The combination of the steering-wheel $c$, driving-wheels $b$, overhanging frame $r$, and gangs of plows I II III, when arranged and operating substantially as described, for the purpose of cultivating between the rows of standing crops.

7. The combination of the straining-frame $n$ and adjusting-screws $n^3$ with the hinged side pieces, $m^2$, of the plow-frame, substantially as described, for the purpose set forth.

8. The ratoon or stubble cutter C, Fig. 5, applied substantially in the manner set forth, in combination with a gang of plows.

9. The plate Y, applied at the lower part of subsoil-plows, substantially as explained, for the purpose of elevating the subsoil previous to turning.

In testimony whereof I have hereunto signed my name.

HENRY COWING.

Witnesses:
WM. D. BALDWIN,
JNO. H. JOHNSON.